E. J. GUAY.
MACHINE FOR MAKING BLANKS FOR GEARS, ROLLS, &c., FROM SPINNABLE TEXTILE FIBERS.
APPLICATION FILED MAY 27, 1918.

1,337,067.

Patented Apr. 13, 1920.

6 SHEETS—SHEET 1.

Inventor,
Emile J. Guay,
by
Att'y.

E. J. GUAY.
MACHINE FOR MAKING BLANKS FOR GEARS, ROLLS, &c., FROM SPINNABLE TEXTILE FIBERS.
APPLICATION FILED MAY 27, 1918.

1,337,067.

Patented Apr. 13, 1920.

6 SHEETS—SHEET 3.

Inventor,
Emile J. Guay,
by Albert G. Davis
Att'y.

E. J. GUAY.
MACHINE FOR MAKING BLANKS FOR GEARS, ROLLS, &c., FROM SPINNABLE TEXTILE FIBERS.
APPLICATION FILED MAY 27, 1918.
1,337,067.
Patented Apr. 13, 1920.
6 SHEETS—SHEET 4.
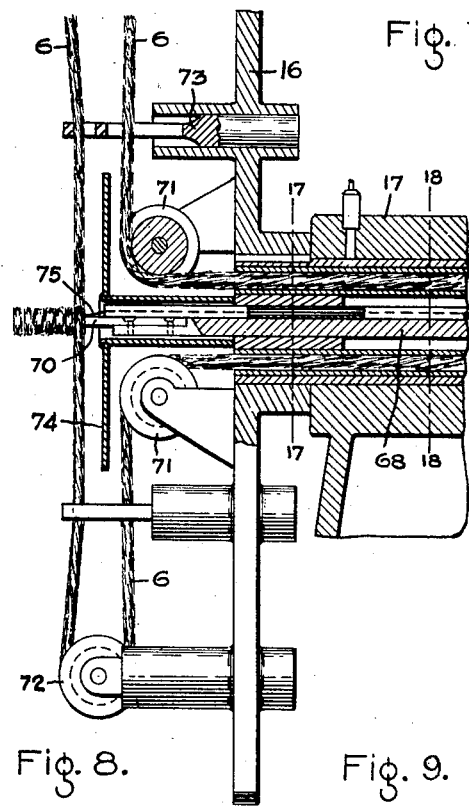
Fig. 7.
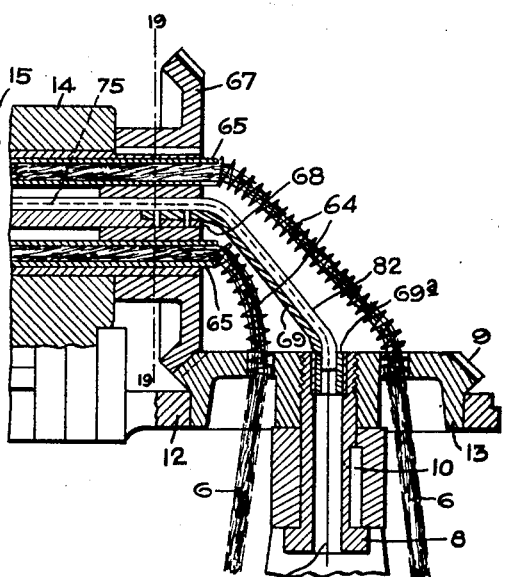
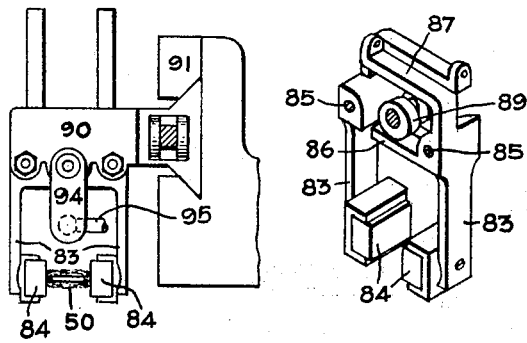
Fig. 8. Fig. 9.
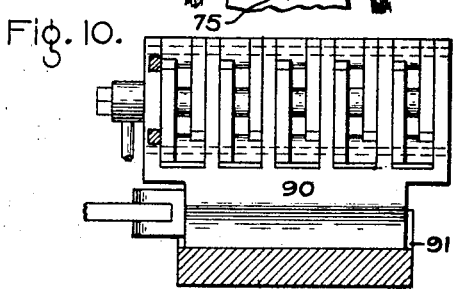
Fig. 10.
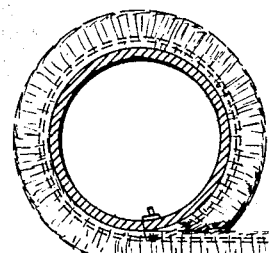
Fig. 12.
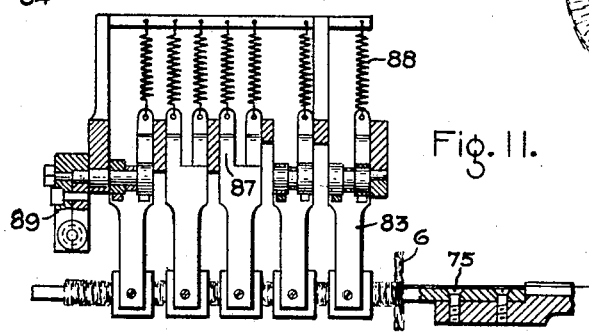
Fig. 11.
Inventor,
Emile J. Guay,
by Albert G. Davis
Att'y.

E. J. GUAY.
MACHINE FOR MAKING BLANKS FOR GEARS, ROLLS, &c., FROM SPINNABLE TEXTILE FIBERS.
APPLICATION FILED MAY 27, 1918.
1,337,067.
Patented Apr. 13, 1920.
6 SHEETS—SHEET 5.
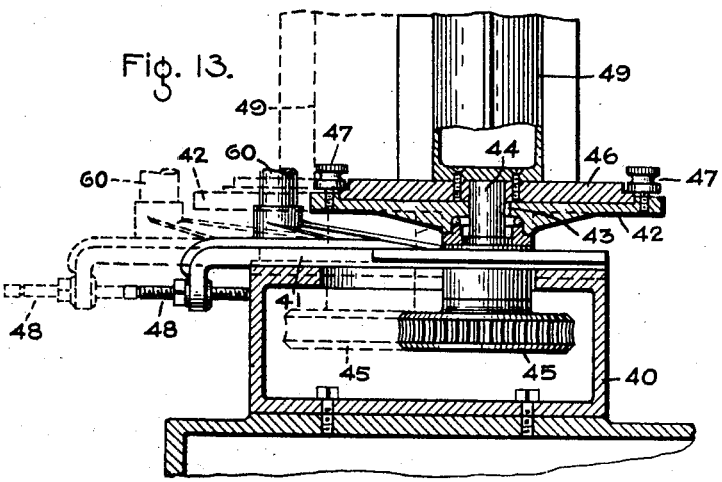
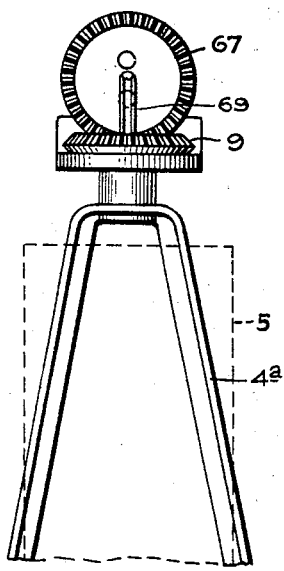
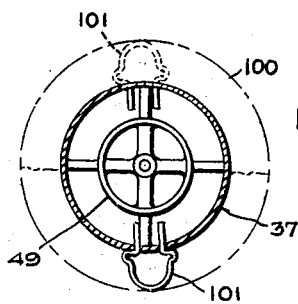
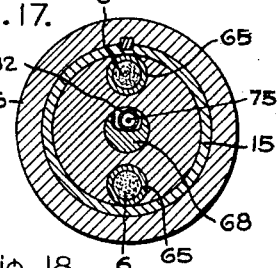
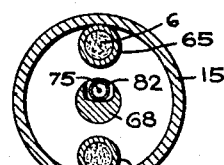
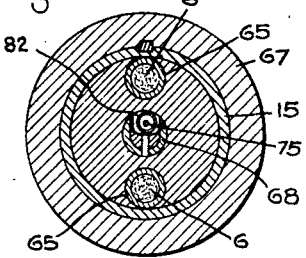
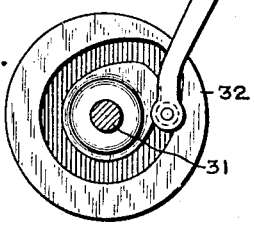
Inventor,
Emile J. Guay,
by
Att'y.

E. J. GUAY.
MACHINE FOR MAKING BLANKS FOR GEARS, ROLLS, &c., FROM SPINNABLE TEXTILE FIBERS.
APPLICATION FILED MAY 27, 1918.

1,337,067.

Patented Apr. 13, 1920.

Inventor,
Emile J. Guay,
by *Albert E. Davis*
Att'y.

UNITED STATES PATENT OFFICE.

EMILE J. GUAY, OF LYNN, MASSACHUSETTS, ASSIGNOR TO GENERAL ELECTRIC COMPANY, A CORPORATION OF NEW YORK.

MACHINE FOR MAKING BLANKS FOR GEARS, ROLLS, &c., FROM SPINNABLE TEXTILE FIBERS.

1,337,067.

Specification of Letters Patent.

Patented Apr. 13, 1920.

Application filed May 27, 1918. Serial No. 236,818.

*To all whom it may concern:*

Be it known that I, EMILE J. GUAY, a citizen of the United States, residing at Lynn, county of Essex, State of Massachusetts, have invented certain new and useful Improvements in Machines for Making Blanks for Gears, Rolls, &c., from Spinnable Textile Fibers, of which the following is a specification.

In my Patent No. 1,275,906, patented August 13, 1918, I have disclosed a blank for gears, rolls, etc., composed of spinnable textile fibers which may be briefly described as follows: The fibers, in the form of sliver, are first wound on a former or mandrel to form a thin and relatively narrow ribbon, strip, element or elongated body with the fibers thereof forming a fine pitch spiral, which ribbon is subsequently wound edgewise to form a helix. The helix is subsequently compressed under heavy pressure in a holder which is arranged to hold said material in a compressed state, after which the blank is finished by ordinary machine operations.

The present invention has for its object to provide a machine for manufacturing such blanks.

For a consideration of what I believe to be novel and my invention, attention is directed to the accompanying description and claims appended thereto.

Figure 1:
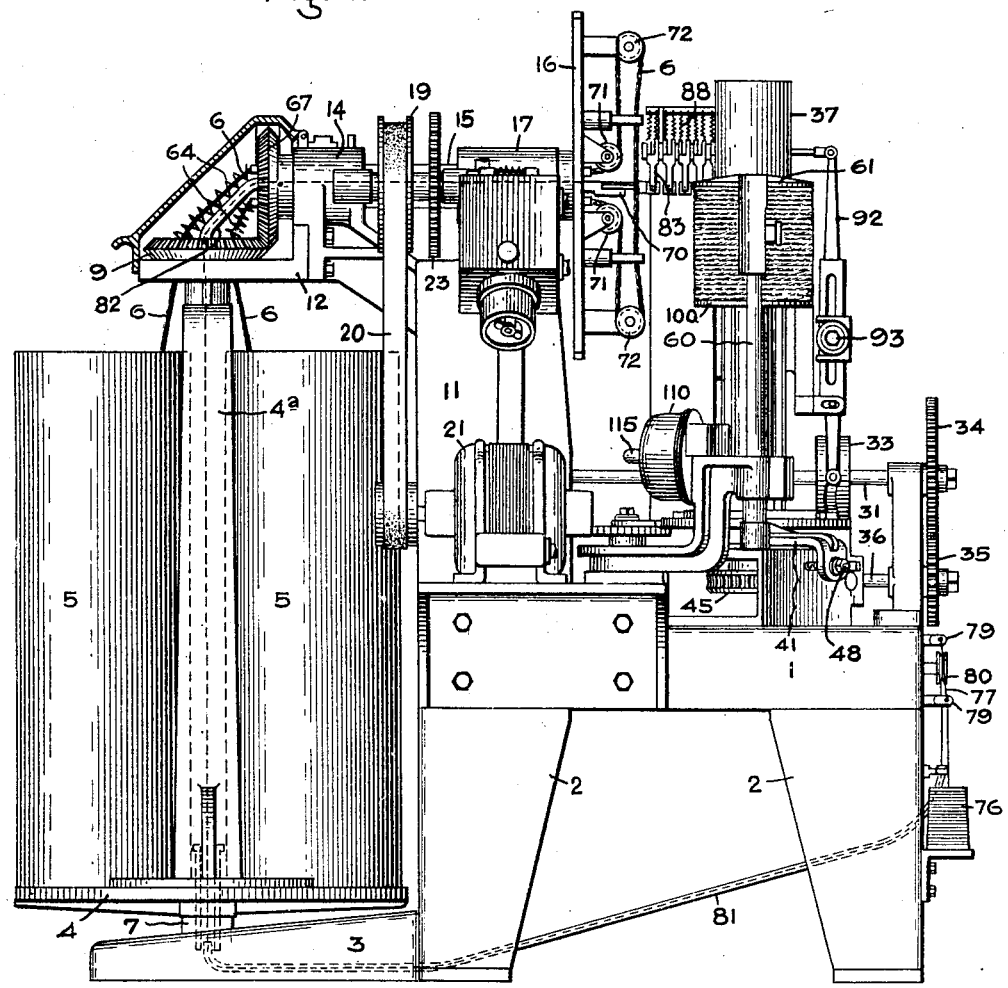
Figure 2:
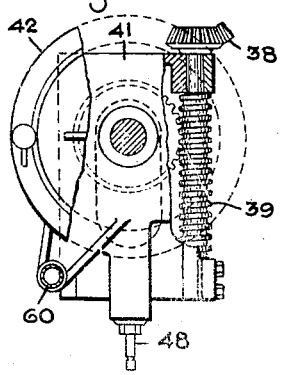
Figure 3:
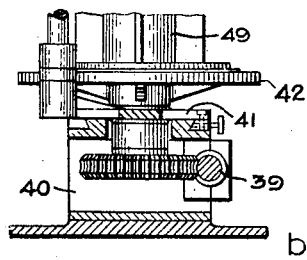
Figure 4:
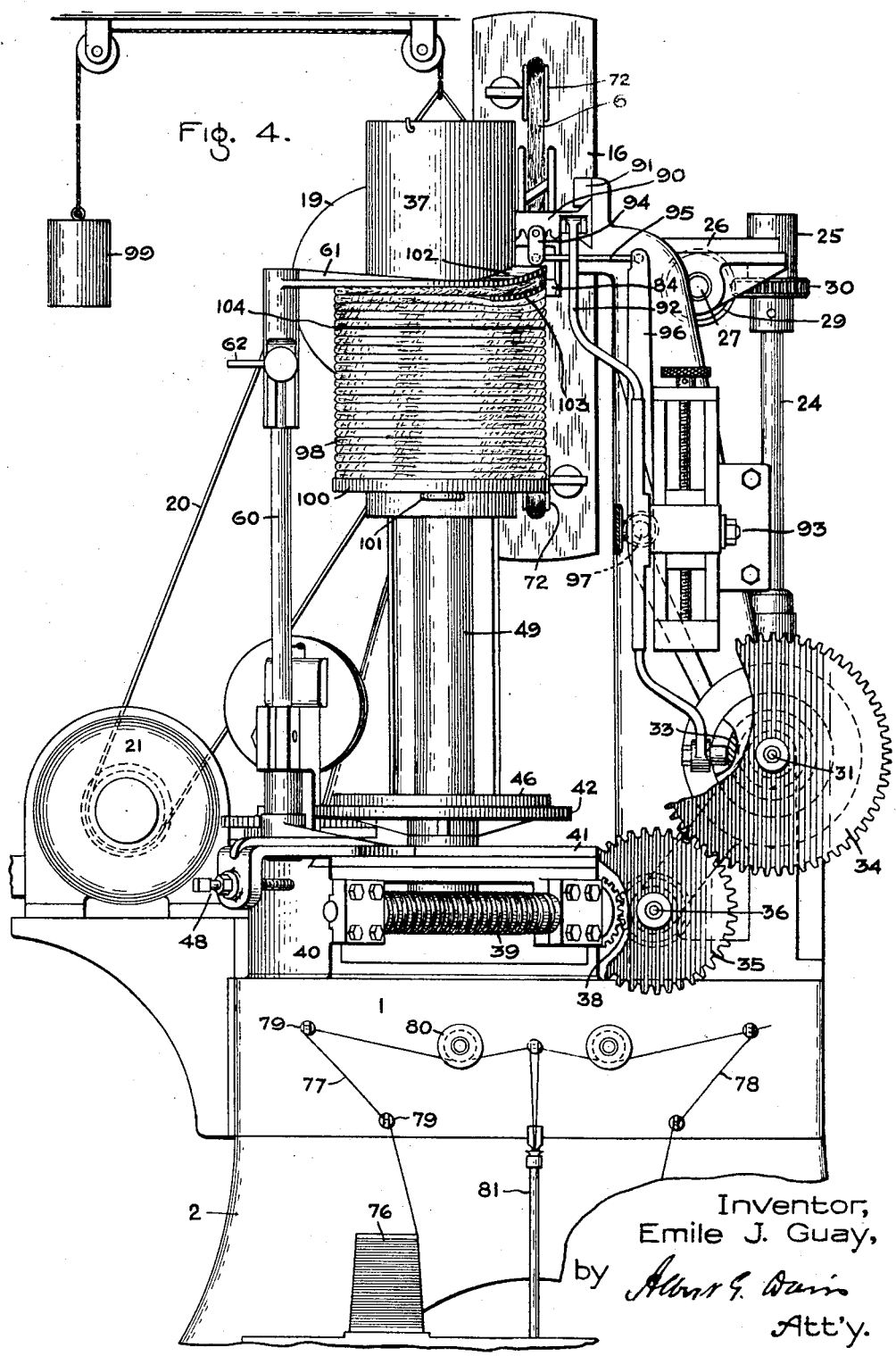
Figure 5:
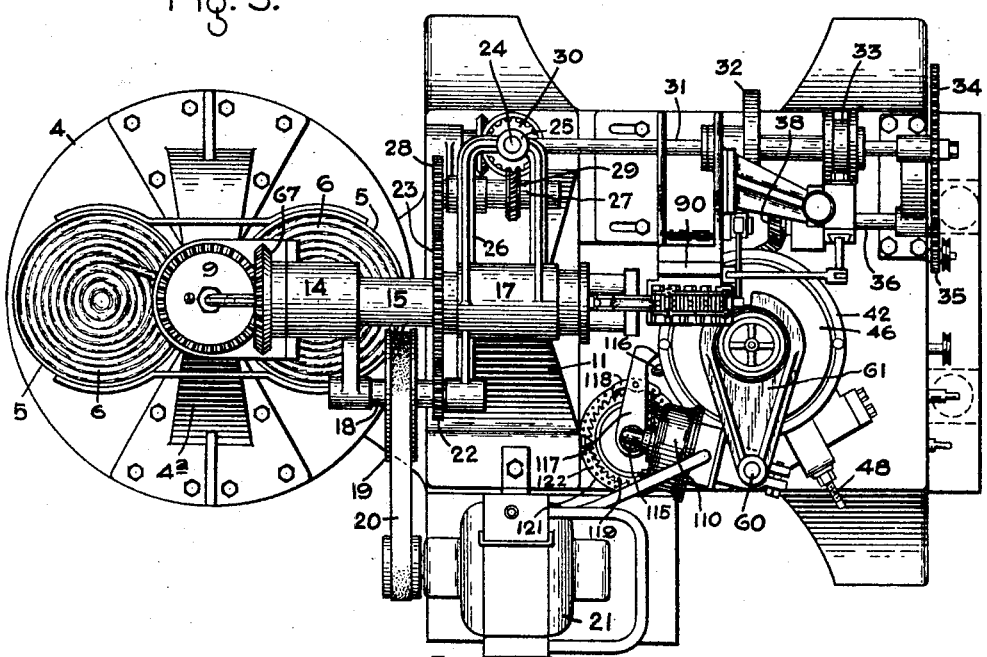
Figure 6:
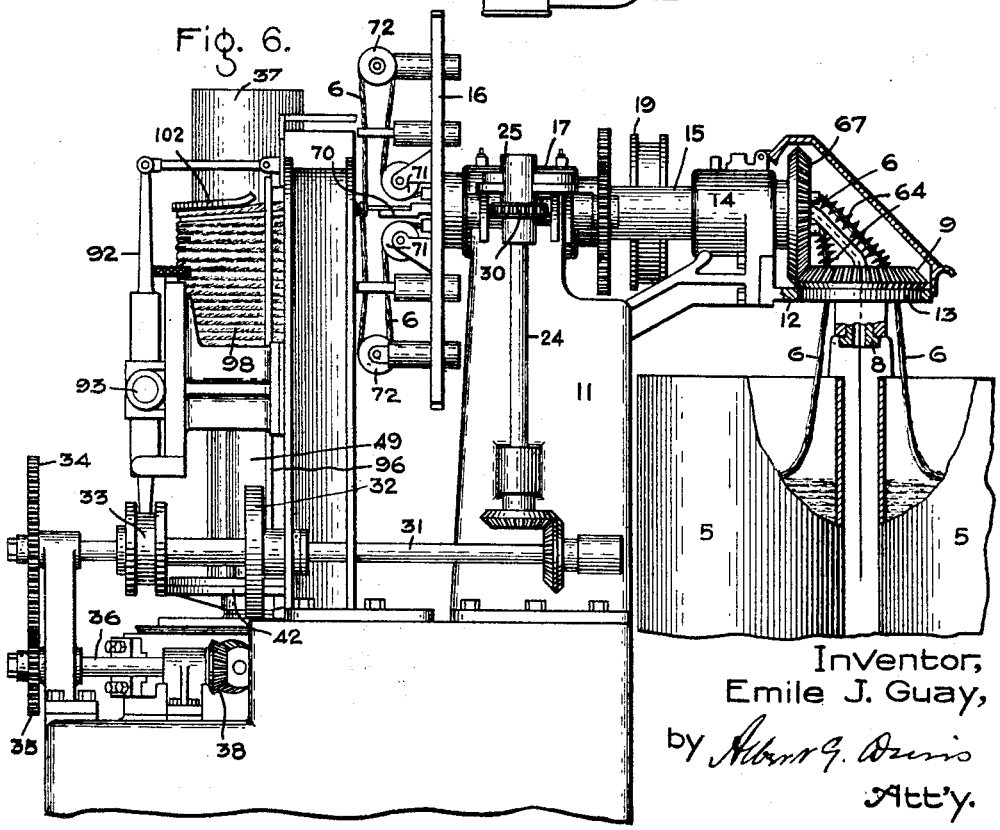
Figure 20:
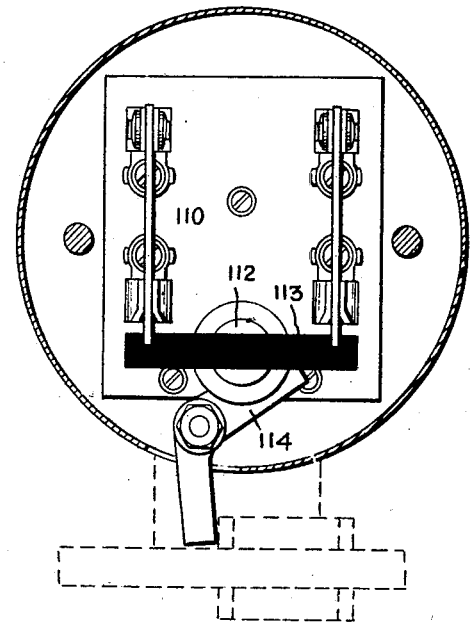
Figure 21:
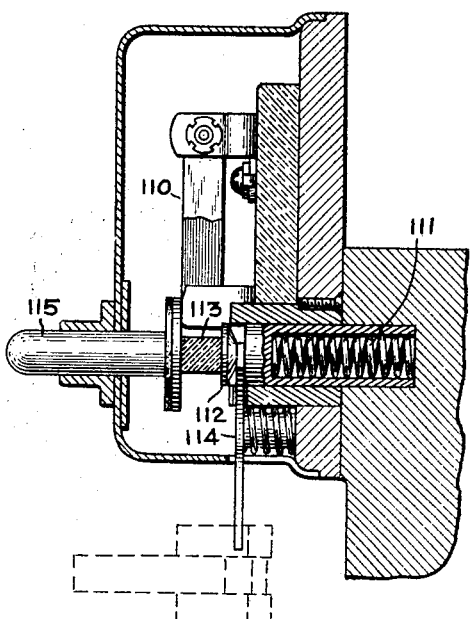
Figure 23:
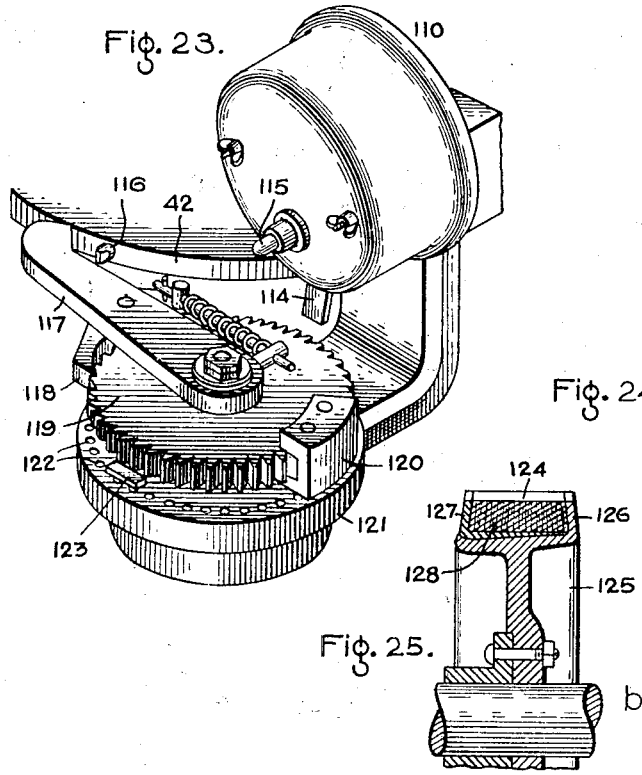
Figure 22:
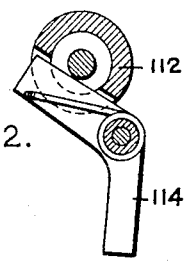
Figure 24:
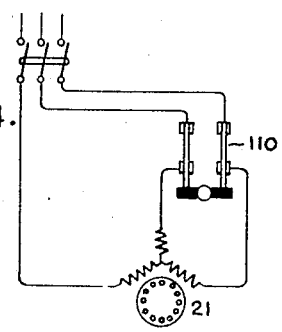
Figure 25:
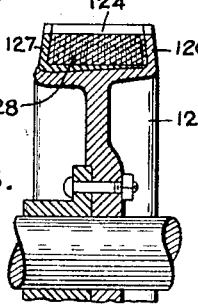

In the accompanying drawings which illustrate one of the embodiments of my invention, Figure 1 is a left side elevation of my improved machine; Fig. 2 is a detail view showing the means for rotating the winding drum; Fig. 3 is another detail view of the same at right angles to the first, and partly in section; Fig. 4 is a front elevation of the machine; Fig. 5 is a plan view thereof; Fig. 6 is a partial view of the right-hand side of the machine; Fig. 7 is a longitudinal section through the shaft which drives the revolving winding head; Fig. 8 is a view in elevation of the feeding means for pushing the spirally wound ribbon off of the former; Fig. 9 is a perspective view of two of the fingers of the feeding mechanism; Fig. 10 is a plan view, partly in section, of said feeding mechanism; Fig. 11 is a side elevation, partly in section, of said feeding mechanism; Fig. 12 is a plan view showing the way the ribbon is wound edgewise into a helix and retained by the core; Fig. 13 is an enlarged detail view, partly in section, showing how the winding drum is supported; Fig. 14 is a detail view showing the means for driving the table which carries the sliver containing cans; Fig. 15 is a detail view showing the means for supporting the lower turn of the helix on the drum; Fig. 16 is a detail view of a cam for opening the fingers of the feeding mechanism; Fig. 17 is a section taken on line 17—17 of Fig. 7 but on a different scale; Fig. 18 is a section through the tubular driving shaft taken on line 18—18 of Fig. 7 but on a different scale; Fig. 19 is a section taken on line 19—19 of Fig. 7 but on a different scale; Fig. 20 is a view in elevation of an automatic switch for stopping the machine after a certain number of turns have been wound on the drum; Fig. 21 is a section through said switch; Fig. 22 is a detail view of the switch releasing means; Fig. 23 is a perspective view of a device for tripping the switch whose action is controlled by revolutions of the winding drum; Fig. 24 is a diagram of the connections of the actuating motor; and Fig. 25 is a quarter section of one of my improved gears having a filler face made of edgewise wound ribbon composed of cotton slivers.

Referring more especially to Figs. 1 to 7, 1 indicates the bed or frame of the machine which is supported by four legs 2. Mounted on an extension 3, which is secured to or forms a part of two of the legs, is a revolving table 4 upon which are supported one or more containers or cans 5 containing the sliver 6 from which the blanks are made. In the present instance these slivers are made of cotton because it is relatively cheap and makes satisfactory blanks but other textile fibers may be employed. The number of cans is determined by the number of slivers used in making the product. My experience is that two slivers form a satisfactory blank, but with different material or modified conditions a greater or less number may be employed.

The table 4 is supported at its lower end in a vertical bearing 7. Bolted to the plate is a frame comprising two side members 4ª which are united at the top and are connected by a hollow spindle 8, Fig. 7, with the beveled driven gear 9. The spindle and frame are united by a key 10. This gear is in turn driven by a beveled gear on the hollow horizontal driving shaft so that the two revolve in synchronism, as will appear later.

Rising vertically from the bed is a supporting column 11 which supports a bracket 12. This latter forms a bearing for the driven gear 9, Fig. 7, said gear having an annular projection 13 on its under side turning in the bearing. On the upper side of the bracket is a bearing 14 for the horizontal rotating hollow shaft 15 which drives the revolving winding head 16. A second bearing for the shaft is indicated at 17. Carried by the bracket and column is a counter shaft 18, Fig. 5, upon which is mounted a pulley 19 connected by a belt 20 with a small pulley on the electric driving motor 21, said motor being supported by an extension of the bed. Secured to the counter shaft 18 is a small gear 22 meshing with a larger gear 23 on the hollow driving shaft of the winding head. On the right-hand side of the machine is a vertical shaft 24, Figs. 5 and 6, which is supported at its upper end in a bearing 25 carried by a bracket 26 secured to the column 11 and by a second and lower bearing also secured to the column. Mounted in bearings on the under side of this bracket is a short horizontal shaft 27 upon which is mounted at the left-hand end a gear 28 meshing with the gear 23. There is also on this shaft a worm 29 meshing with the worm wheel 30. Motion from the vertical shaft 24 is transmitted to the horizontal shaft 31, Fig. 6, by bevel gears. Mounted on the shaft 31 is cam 32, shown in detail in Fig. 16, a second cam 33, both forming a part of the feeding mechanism as will appear later, and a gear 34 which drives a smaller gear 35 mounted on a lower horizontal shaft 36 for rotating the ribbon receiving drum 37 and parts associated therewith. For different diameters of blanks the gears 34 and 35 are changed to change the speed ratio. On the inner end of the shaft 36 is a bevel gear 38 meshing with a corresponding gear which drives the worm 39, Figs. 2 and 4. The worm is mounted in bearings supported by a hollow box-like frame 40 mounted on the bed. The upper face of the frame is provided with a dove-tail guide upon which is mounted a sliding member 41. The member is normally fixed in position when the machine is in operation but is pulled out in a diagonal direction to the left, viewed from the front of the machine, when it becomes necessary to remove the drum, after the ribbon is wound thereon. Supported by a ball bearing on the sliding member is a revolving table 42, Fig. 13, which is connected by the key 43 to the short vertical shaft 44 to whose lower end is attached the worm wheel 45 which meshes with the worm 39 previously described. The shaft is carried by a bearing on the slide. The table has an annular recess in which is seated a head 46, the shaft 44 extending freely through it and serving as a guide to hold it central. One or more clamps 47 serve to normally unite the head and table. The clamps are released when it is desired to rotate the ribbon carrying drum independently of the revolving bed, as for example in taking a wound blank from the machine. 48 is an adjustable stop carried by an extension on the slide to limit its inward or return movement. To the upper side of the head is attached a tubular member 49 having radial webs, the whole forming an internal guide for the drum 37 on which the textile material is wound. Also mounted on the slide is an upright post 60, Figs. 4 and 13, carrying at its upper end an adjustable member 61 which has two arms with overlapping ends encircling the drum between which the ribbon or elongated body 50 passes. It thus forms a presser for partially consolidating the textile fibers, in this case cotton sliver, and also a guide for the ribbon or strip as received on to the winding drum. It is best shown in Figs. 4, 5 and 6. The member is fixed in position on the post for one size of blank but can be adjusted vertically for other sizes by manipulating the hand clamp 62, Fig. 4. By reason of its construction and position the member 61 also acts as a means for receiving the ribbon made on the former and delivering it to the drum for edgewise winding thereon.

Referring now to the parts which act directly on the sliver which is contained in the cans 5, 6 indicates the sliver which is coiled in the cans in any suitable manner. Ordinarily the sliver is taken just as received from the manufacturer and placed in the cans. It is then threaded through diametrically opposite holes in the gear 9, as shown in Fig. 7, and then passed through tubes in the hollow revolving shaft 15 to the winding head 16. To guide the two slivers and also to support them to a certain extent, and prevent engagement with other parts which might cause trouble, each passes through a guide which is capable of expanding and contracting as the gear and cans revolve, it being noted that as the cans revolve about the axis of the frame and hollow spindle 8, the distance between the holes in the gear 9 and the adjacent ends of the tubes in the horizontal shaft 15 alternately increase and decrease. I have found coiled springs 64 to be satisfactory for the purpose.

The spindle 15 is made hollow to receive the sliver containing tubes 65 and these tubes are held in place by the hub of the driving gear 67 and that of the revolving winding head 16.

On the right-hand end of the spindle is keyed gear 67 and on the left-hand end the winding head 16, the said tubes 65 extending through both. Extending axially of the spindle is a strong stationary grooved member 68, shown in cross section in Figs. 17 to 19. It is held against both axial and angular movement by the downwardly extending member 69, the lower end of which is secured to a short tube 69ª which is surrounded by a bearing liner located in the upper end of the hollow spindle 8 of the revolving can carrying frame. To the left-hand end of the member 68 is secured a stationary former or mandrel 70 which is relatively long and flat and has a substantial width as compared to its thickness and around which the ribbon, strip or element 50, best shown in Fig. 12, is wound or formed. The width and thickness of this former are determined by the radial depth of the textile material which the finished blank is to have. The former is tangentially arranged with respect to the winding drum 37 with one of its thin edges presented thereto. In other words the plane of the former is perpendicular to axis of the drum so that the ribbon leaving the former is presented in edge-wise fashion to the surface of the drum. The stationary grooved member 68 is securely supported at its ends by bearing surfaces in the hubs of the revolving head 16 and the gear 67, and as will be evident the sliver containing tubes 65 revolve about said member. It is necessary that the member be strong and well supported for it is the sole support for the former. The slivers 6, whether one or more are used, after leaving the tubes 65 pass over inner and outer loose grooved pulleys 71 and 72, two pulleys being provided for each sliver. The spindles for the pulleys are fixed, and between the inner and outer pulleys are adjustable guides 73 containing free openings for the slivers, each guide comprising a piston which is free to slide axially and thus adjust itself to properly guide the slivers as they are wound around the former 70. To prevent interference between the portions of the sliver which move radially outward and those which move radially inward, a guard is provided comprising in the present instance a flat disk 74 mounted on the outer end of a tube, the latter being secured, as by flanges, to the head 16 and therefore revolves with it. It will be seen that by the arrangement of the parts the sliver, as it moves through the machine, has its path of travel changed from a horizontal to a radial one so that said sliver is wound on the former or mandrel 70 in a manner to form a ribbon with fine pitch spirally arranged fibers. This spiral feature is brought about by suitable feeding devices, to be described later, which keep pushing said ribbon, in reality a thin, flattened tube with the fibers extending generally cross-wise off of the former as fast as it is made. The feeding has to be so coördinated with the winding operation that the turns occupy their proper positions, neither piling up one on the other or leaving spaces between. By changing the relative speeds of the various parts the pitch of the spiral on the former or mandrel 70 may be increased or decreased.

In order to temporarily hold the turns of the spiral forming the ribbon between the time the ribbon leaves the former 70 and is wound on the drum and also to hold or bind the turns of the helix on the winding drum 37, a core 75 is provided which may be be composed of a single thread or wire, but which is preferably composed of two such threads or wires so that if one breaks the other can be used as a means for re-threading the broken one through the machine. For example if a thread breaks the broken portion is pulled out. The spool or supply end of the thread is then knotted to the other and pulled by hand through the machine until the knot appears at the drum when both threads are connected thereto. In some cases the helix can be finished with a single thread core, after which both threads are used as before. Without this, the re-threading operation would obviously be rendered more difficult and further an entire helix might have to be discarded if a break occurs. On the front of the machine in plain view of the operator are two spools 76, Fig. 4, of core material, of which one is shown. The threads 77 and 78 pass through suitable tension devices 79 and under pulleys 80 after which they pass through a tube 81, Fig. 1, to the center of the revolving can carrying table 4, and thence upwardly through the hollow spindle 8 of the revolving frame. The threads then pass through a stationary guiding tube 82, Fig. 7, a part of which is within the grooved member 68 and the hollow spindle that drives the winding head. The threads or core after leaving the tube follow alongside the former 70 over which the sliver is being wound. In winding the helix one end of the core is fastened to the drum 37 as will appear more fully later on. The tension exerted on the core as it is pulled by said drum against a resistance holds the ribbon 50 in firm engagement with the drum and also guides it between the former 70 and the drum.

The next thing to be considered is the means for feeding or moving the fine pitch spirally-wound ribbon composed of sliver off of the former 70 and depositing it on the drum. The means can be made in different ways, one suitable construction being shown. Referring more especially to Figs. 8 to 11, inclusive, the front end of the former 70 is shown in elevation and around it is the ribbon 50 composed of sliver. On opposite sides of the former are fingers 83, each carrying a friction block 84. The fingers are best shown in Fig. 9, and each has a pivot 85, and two parallel arms 86 and 87. To the upper arm 87 is attached a tension spring 88 and engaging with the lower arm 86 is an eccentric or cam 89 which at certain intervals depresses the lower arms 86 of the fingers and causes them to release the ribbon on the former. All of these fingers are mounted in a carriage 90 which is mounted to reciprocate in dovetail slides 91. The reciprocating movement is accomplished through the lever 92, Fig. 1, which has an adjustable pivot 93 by means of which its stroke can be changed as desired. The lower end has a roller which enters the groove in the cam 33 on the right-hand side of the machine. As the cam rotates it moves the carriage 90 forward to push the ribbon off of the former 70 and on to the drum 37. It is evident that the fingers must be opened on the return stroke of the carriage to enable them to take a new hold on the ribbon. This opening is accomplished, as stated above, by the cams 89. To move the cams an arm 94 is mounted on the end of the cam shaft and this is connected by a rod 95 with a vertically disposed vibrating lever 96, Fig. 4, which has a pivot 97. The lower end of the lever has a roller, Fig. 16, which travels in the cam path in the cam 32. The action is briefly as follows: The fingers due to spring tension grasp the ribbon and push it forward toward the operator under the action of cam 33 and lever 92. At the end of the stroke the cams 89 open the fingers and while they are held open the carriage is quickly returned to the rear end of its stroke at which time the cams release the fingers and the springs 88 cause them to grasp the ribbon preparatory to the forward or feeding movement.

The next step to consider is the formation of the helix 98. Mounted on the vertical guide 49, Fig. 4, is the drum 37 which is suspended by a counterweight 99 connected thereto by a wire rope. The weight tends to raise the drum and thus hold it against the presser 61, said drum moving downward as the winding proceeds. On the lower end of the drum is a ring 100 supported by any suitable means such as the spring clips 101, Figs. 4 and 15. The clips also prevent independent rotation of the drum and its guide. In winding the operator first pulls a certain amount of the core 75 through the machine and fastens one end to the drum after which the driving motor is started which causes the table 42 and drum 37 to revolve. As the winding head 16 revolves, it pulls the slivers through the tubes 65 in its hollow driving spindle 15 from the revolving cans 5, and winds them on the former 70 in the form of a relatively thin ribbon with the fibers extending generally cross-wise. As the drum rotates the tension on the core 75 binds the turns on the drum and the feeding mechanism as it advances feeds the ribbon forward at the necessary rate to supply it to the rotating drum. The presser 61 has two arms, 102 and 103, between which the ribbon is fed and guided and as the counterweight tends to raise the drum some endwise pressure is exerted on the helix which consolidates the fibers to a certain extent. As the winding proceeds the drum moves downwardly against the weight until the helix is completed when the machine automatically stops. The operator then releases the clamps 47, Fig. 13, which unite the base of the guide 49 and the revolving table 42, cuts the ribbon and turns the drum by hand which pulls out a certain amount of the core which is later employed to fasten the last turn of the helix. The drum and its support are then moved diagonally to the left, as indicated in dotted lines Fig. 13, to permit the drum to be removed and a new one substituted. To do this it is necessary to release the hand clamp 62, Fig. 4, and remove the presser and guide 61 by a vertical upward movement. A new drum is then inserted in the machine and the presser and guide replaced. The parts are then returned to normal position and the table 42 and guide 49 clamped together when the machine is ready to wind the next helix.

I may wind on the drum enough ribbon to form a single blank or a greater number as desired depending upon the length of the helix required and on the length of the drum. Where two or more blanks are to be formed in the same winding operation a sheet of paper 104, Fig. 4, or other separator is inserted at the proper place between the turns of the helix. This indicates to the workman the proper point of division and also facilitates said division because it prevents the cotton in adjacent turns from sticking together. To enable the operator to put the paper in at the proper point a device, to be described later, is arranged to stop the machine after a predetermined number of turns of the helix has been wound, after which the machine is restarted.

The means for automatically stopping the machine after a helix or a portion of a helix of the desired axial length is wound will now be described. (See Figs. 20 to 24). The motor 21, which may be of any suitable character, in this case a three-phase alternating current motor, is provided with a circuit breaker or switch 110 and is normally biased to open by the compression spring 111. The spring is surrounded by a plunger 112 which engages the insulating cross piece 113 between the switch blades. The plunger is slotted at its outer end and entering the slot is a pivoted spring-pressed latch 114 which normally serves to hold the plunger in its retracted position and the switch blades in engagement with the fixed terminals. When the latch is moved out of the slot by the action of the revolving table 42, the spring plunger opens the switch and the motor is stopped. The switch is reset by the handle or pusher 115 which extends through the switch casing. On the revolving table 42 is located a pin 116 that engages the arm 117 once for every revolution of the table. The arm is suitably pivoted and carries a spring-pressed pawl 118 which engages the teeth on the ratchet wheel 119 and advances it step by step. On the ratchet wheel is a block 120 extending into the path of the latch 114 for moving it in a direction to release the switch. Below the ratchet wheel is a plate 121 which carries the pivot for the arm 117 and also has a series of holes 122 so arranged that the distance between two of them is equivalent to one rotation of the winding drum 37. In these holes is mounted an adjustable stop 123. By changing the position of the stop, which is in the path of the block 120, the number of turns in the helix can be changed. Each time the motor circuit is interrupted by the switch the ratchet wheel 119 is revolved backward by hand until the block 120 engages the stop. To do this it is necessary to raise the pawl 118 out of engagement which can easily be done.

In Fig. 25 is shown in section a part of a gear blank having its filler face 124 composed of sliver which is first wound into a narrow strip or ribbon and then wound edgewise into a helix and later highly compressed. The material is held under compression by a holder of any suitable construction. The one shown comprises a main body 125 having a flange 126 on one side and a second flanged member 127 on the other side. The material at 128 is rolled over to unite the two parts. The hub may be made in one piece with the main body or separate as desired.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:—

1. In a machine of the character described, the combination of a means for forming a flat elongated body of textile material in which the fibers extend generally crosswise thereof, a receiving means on which the body is wound edgewise to form a helix, the forming and receiving means being relatively rotatable, and a means for guiding the body from one means to the other.

2. In a machine of the character described, the combination of means for continuously forming a relatively thin flat body from sliver with the fibers extending generally crosswise thereof, a receiving means on which the body is disposed edgewise to form a helix, the forming and receiving means being relatively rotatable, and a means which positively moves the body from the forming means and delivers it to the receiving means.

3. In a machine of the character described, the combination of forming means, means for winding textile material around the forming means to form a flat, elongated strip, a revolving drum arranged to receive the material edgewise and form it into a helix, and means receiving the material from the forming means and delivering it to the drum.

4. In a machine of the character described the combination of a forming means, means for winding textile material about the forming means into a flat elongated body, a revolving drum arranged to receive the body and form it into a helix, said body being wound edgewise, and means for progressively moving the body along the forming means and delivering it to the drum.

5. In a machine of the character described, the combination of a stationary former, a head for winding textile material around the former to form a flat elongated body, a revolving drum, feeding mechanism which progressively pushes the body off of the former, and a guide which receives the body as it leaves the former and guides it edgewise onto the drum as the latter revolves.

6. In a machine of the character described, the combination of a stationary former which is relatively thin and wide, a revolving head which winds sliver of textile material around the former to form a fine pitch spirally wound ribbon, a revolving drum arranged with its periphery tangential to said former, means for moving the ribbon off of the former and delivering it to the drum, and means for partially consolidating the ribbon on the drum by endwise pressure.

7. In a machine of the character described, the combination of forming means, a core which extends lengthwise of said means, means for winding textile material around the forming means and core, a revolving drum arranged to receive the material and form a helix, the turns of which are bound on the drum by the core, and means receiving the material from the forming means and delivering it to the winding drum.

8. In a machine of the character described, the combination of a winding drum, a relatively thin former which is presented edgewise to the winding drum, a winding head which rotates about the former and winds textile material thereon to form a ribbon, a core over which the material is also wound which is attached at one end to the drum and is under tension, said core binding the turns of the ribbon edgewise on the drum, and means receiving the ribbon from the former and directing it on to the drum in edgewise relation to its periphery.

9. In a machine of the character described, the combination of a winding drum, a former, a revolving head for winding textile material on the former to form a flat elongated strip, revolving means for supplying the material to the head, feeding mechanism for moving the material along the former toward the drum, and means for guiding said material from the former edgewise onto the drum.

10. In a machine of the character described, the combination of a winding drum, a former, a revolving head for winding textile material around the former in spiral form, a driving shaft for the head, revolving means which carry said material, means for conveying the material from the means to the head, mechanism for pushing the material off of said former as it is made, and means for binding the material on the drum.

11. In a machine of the character described, the combination of a rotating winding drum, a former which is tangentially disposed with respect to the drum, a winding head whose plane of movement is perpendicular to said former, means carried by the head for winding textile material on said former in the form of a fine pitch spiral, a hollow driving shaft for the head, revolving containers for the material, means for guiding the material through the shaft to the head, and means for causing the material wound on said former to be deposited on the drum.

12. In a machine of the character described, the combination of a rotating winding drum, a former which is tangentially disposed with respect to the drum, a winding head which rotates around the former, a driving shaft, means for feeding sliver through the shaft to the head, means on the head which receive the sliver and change its path of movement from an axial to a radial direction and wind it around said former to form a ribbon, a container for the sliver which is rotated in synchronism with the shaft, and means receiving the ribbon from said former and delivering it to the drum.

13. In a machine of the character described, the combination of a winding head through which the textile material passes axially, a set of rollers on the head which change the direction of movement of the material from axial to radial, a guard which prevents the material moving outward on the head from engaging that moving inwardly thereon, and a former around which the head winds said material.

14. In a machine of the character described, the combination of a winding head, a hollow driving shaft therefor, tubes in the shaft through which sliver passes to the head, a stationary former about the axis of which the head revolves, a core which extends longitudinally of said former and shaft and a tube through which the core passes to said former.

15. In a machine of the character described, the combination of a winding head, a hollow driving shaft therefor, tubes in the shaft through which sliver passes to the head, a container for the sliver, means for rotating the container in synchronism with the shaft, and a former around which the head winds the sliver to form a ribbon in which the fibers extend generally crosswise.

16. In a machine of the character described, the combination of a winding head, a hollow driving shaft therefor through which slivers pass to the head, an independent container for each of the slivers which are carried by a frame, and gearing between the shaft and frame for rotating the latter, said slivers passing through openings in both of said gears to the interior of the shaft.

17. In a machine of the character described, the combination of a winding head, a hollow driving shaft therefor through which slivers pass to the head, an independent container for each of the slivers which are carried by a frame, gearing between the shaft and frame for rotating the latter, said slivers passing through openings in both of said gears to the interior of the shaft, and guides connecting the gears through which the slivers pass from one to the other.

18. In a machine of the character described, the combination of a winding head, a hollow driving shaft through which slivers pass to the head, rotating containers for the slivers, gearing for driving the containers from the shaft, said slivers passing through openings in the gears, and coiled springs whose ends are seated in the gears and through which the slivers pass from the containers into the shaft.

19. In a machine of the character described, the combination of a stationary former, a head for winding textile material around said former to form a ribbon, a feeding mechanism for pushing the ribbon off of said former which comprises a reciprocating carriage, spring pressed fingers, and means for opening the fingers at one end of stroke of the carriage and permitting them to close at the other end of the stroke.

20. In a machine of the character described, the combination of a stationary flat former which is relatively thin and wide, a head for winding textile material on said former to form a ribbon, a feeding mechanism for moving the ribbon along said former which comprises a reciprocating carriage, spring pressed fingers, a friction block on each finger which engages the material on opposite edges of said former, cams for moving the blocks out of engagement with the material at one end of the stroke of the carriage and releasing them at the other end, and means for periodically actuating the cams.

21. In a machine of the character described, the combination of a former, a head for winding textile fibers around said former to form an elongated body, a drum on which the body is subsequently wound, a feeding mechanism for moving the body along said former which comprises a carriage and a plurality of fingers, a cam for reciprocating the carriage, a second cam for opening the fingers at one end of the stroke of the carriage, and means for closing the fingers at the opposite end of the stroke.

22. In a machine of the character described, the combination of means for forming a body of textile material, a drum upon which the body is wound, means for rotating the drum, a guide on which the drum is adjustable, a stationary device for guiding said body as it is wound on the drum, and means acting on the drum for yieldingly holding the last turn of the body on the drum in engagement with said device.

23. In a machine of the character described, the combination of means forming an elongated body of textile material, a drum on which the body is wound to form a helix, a guide upon which the drum is axially movable, means for rotating the guide and drum, a yieldable means which tends at all times to move the drum away from one end of the guide, and a stationary guide which directs the body as it is wound on the drum and also serves in connection with said yielding means to partially consolidate the helix by exerting axial pressure thereon.

24. In a machine of the character described, the combination of means for forming a ribbon of textile material, a drum upon which the ribbon is wound, a rotating table upon which the drum is mounted, and a sliding member upon which the table is mounted whereby it can be moved away from its normal position to permit the removal of the drum.

25. In a machine of the character described, the combination of means for winding sliver to form a ribbon, a rotating element on which the ribbon is wound edgewise, means for driving the forming means and element, and means actuated by the element for disconnecting the driving means after a predetermined number of turns have been wound on the element.

26. In a machine of the character described, the combination of means for winding sliver to form a ribbon, a rotating element on which the ribbon is wound to form a helix, an electric motor for causing relative rotation of the ribbon forming means and the element, a switch for the motor circuit, a ratchet and pawl mechanism associated with the element, and means actuated thereby for opening the switch after a predetermined number of turns of the helix has been formed.

27. In a machine of the character described, the combination of a former around which sliver is wound to form a hollow flat ribbon with the fibers extending generally crosswise thereof, a double core which extends lengthwise of said former and over which the sliver is also wound, a rotating drum to which the core is fastened at one end, said core serving to bind the ribbon edgewise on the drum, and a tension device for the core as it is fed through the machine.

28. In a machine of the character described, the combination of a former, a revolving head which winds sliver of textile fibers around it to form a ribbon, a revolving drum on which the ribbon is wound edgewise, and a core over which the sliver is also wound, said core being connected to the drum and serving as a means to hold the ribbon in its passage from said former to the drum.

29. In a machine of the character described, the combination of a revolving drum, means for feeding ribbon to the drum on which it is wound edgewise, and means for guiding the ribbon as it is wound on the drum comprising a member having two overlapping ends which surround the drum and between which the ribbon passes, and a support for the member.

In witness whereof I have hereunto set my hand this 22nd day of May 1918.

EMILE J. GUAY.